(12) United States Patent
Mittal et al.

(10) Patent No.: US 6,686,720 B2
(45) Date of Patent: Feb. 3, 2004

(54) VENTED-TYPE LEAK RESISTANT MOTOR CYCLE BATTERY

(75) Inventors: Surendra Kumar Mittal, Calcutta (IN); Debashish Mazumdar, Calcutta (IN); Partha Dasgupta, Calcutta (IN)

(73) Assignees: Exide Industries Ltd., Calcutta (IN); Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/245,997

(22) Filed: Sep. 17, 2002

(65) Prior Publication Data

US 2003/0059669 A1 Mar. 27, 2003

(30) Foreign Application Priority Data

Sep. 25, 2001 (JP) ........................................ 2001-290646

(51) Int. Cl.$^7$ .............................................. H01M 10/46
(52) U.S. Cl. ......................................... 320/107; 429/82
(58) Field of Search ................................ 320/107, 110, 320/112, 113, 114, 115, 116, 147; 429/72, 71, 77, 78, 82, 83, 84

(56) References Cited

U.S. PATENT DOCUMENTS

| 4,207,387 A | 6/1980 | Jutte ............................ 429/88 |
| 4,613,550 A | 9/1986 | Jergl et al. ...................... 429/53 |
| 4,851,305 A | 7/1989 | Kump et al. .................... 429/84 |
| 5,683,830 A | * 11/1997 | Fritts et al. |
| 5,800,942 A | * 9/1998 | Hamada et al. |
| 5,843,593 A | 12/1998 | Fritts et al. ..................... 429/84 |
| 6,110,617 A | * 8/2000 | Feres |
| RE37,901 E | * 11/2002 | Fritts et al. |

FOREIGN PATENT DOCUMENTS

| EP | 0274612 | 7/1988 | ............. H01M/2/12 |
| EP | 0462403 | 12/1991 | ............. H01M/2/12 |
| EP | 1 112 0980 | 4/1999 | ............. H01M/2/12 |
| WO | WO 99/48161 | 9/1999 | ............. H01M/2/12 |

* cited by examiner

*Primary Examiner*—Edward H. Tso
(74) *Attorney, Agent, or Firm*—Pearne & Gordon LLP (57) ABSTRACT

A vented-type leak-resistant motor cycle battery comprising a housing in which a plurality of cells are mounted, a battery cover sealed to an upper end of the housing in a liquid tight manner so that the battery cover overlies the cells each having a vent chamber, a filling hole and a filling plug and a vent chamber cover sealed to the battery cover in a liquid tight manner, the battery cover being provided with a vent line extending in a longitudinal direction of the battery cover in flow communication with the spaces above the cells and having an exit end tilted upwardly toward the outside and a vent cap assembly being fitted to the vent line at the tilted exit end.

20 Claims, 13 Drawing Sheets

VENTED-TYPE LEAK RESISTANT MOTOR CYCLE BATTERY

TECHNICAL FIELD OF THE INVENTION

This invention relates to an improvement on a vented-type leak resistant motor cycle battery.

BACKGROUND OF THE INVENTION

The prior art vented type motor cycle batteries with free electrolyte are usually provided with a single vent tube that is fitted with a flexible, polymeric exhaust pipe for the safe exit of acidic mist and exhaust gases. Under the actual service condition, however, this arrangement is not entirely reliable because many a time the flexible exhaust pipe gets detached from the batteries. Thus, there exists some possibility of hazard due to leakage of the acidic mist together with the exhaust gases within the battery housing under the actual service conditions.

In view of the above, there is a trend in the industry to switch over to sealed type valve regulated lead-acid (VRLA) batteries for motor cycle applications, which are essentially leak-proof as they do not contain any free electrolyte. However, the sealed type batteries are significantly more expensive and also involve relatively complex manufacturing processes. Besides, the sealed type VRLA batteries can only be fitted on modern 2-wheelers equipped with an improved charging system suitable for the sealed type batteries.

However, for a vast range of vented-type batteries, there is a need to make them leak-resistant in all directions for safety as also to dispense with the need for the flexible exhaust pipe. It should be noted that the motor cycle batteries in service may be subjected to high degree of tilt in all directions. Therefore, from the safety point of view, it is highly desirable for the batteries to have leak-resistance characteristics.

Thus far, there has been no major attempt in the industry to impart leak-resistant characteristics to the flooded motor cycle batteries. Hence, the present innovation aims at bridging this technology gap in the vented-type motor cycle battery range.

The motor cycle battery cover conventionally comprises two parts, namely a main cover and a vent chamber cover heat-sealed to the main cover. However, there is a possibility of spillage of electrolyte when the battery is not in the upright position.

SUMMARY OF THE INVENTION

Accordingly, it is a principal object of the invention to provide a vented type motor cycle battery having safeguards against leakage in all directions for a substantial length of time even when the battery is not in an upright position.

In accordance with one aspect of the invention, there is provided a vented-type leak-resistant motor cycle battery comprising: a housing in which a plurality of cells are mounted; a battery cover sealed to an upper end of the housing in a liquid tight manner so that the battery cover overlies the cells each having a vent chamber, a filling hole and a filling plug; and a vent chamber cover sealed to the main cover in a liquid tight manner, characterized in that the battery cover is provided with a vent line extending in a longitudinal direction of the battery cover in flow communication with the spaces above the cells and having an exit end tilted upwardly and that a vent cap assembly is fitted to the vent line at the tilted exit end.

In the aforementioned aspect of the present invention, the end of the vent line opposite to the exit end thereof may be closed and the exit end of the vent line may be preferably tilted or sloped downwardly toward the opposite end of the vent line.

Furthermore, there may be preferably vent chambers for the respective cells provided inside of the vent line and communicating with each other. The vent chamber furthest from the exit end of the vent line may have an exit hole in communication with the vent line.

The vent chambers may be formed of baffle sheet and the vent cap assembly may be more preferably formed so that gases from the exit end of the vent line contact a gas filter through a labyrinth.

The labyrinth may be provided in a vent cap and may comprise a vent hole in communication with the tilted exit end of the vent line, a first vertical hole extending from the vent hole to the outer periphery of the vent cap, a helical path on the outer periphery of the vent cap and connected at its one end to the first vertical hole and at its other end to a second vertical hole extending to the center of the vent cap so as to be in communication with the gas filter.

In accordance with another aspect of the invention, there is provided a vented-type leak-resistant motor cycle battery comprising: a housing in which a plurality of cells are mounted; a battery cover thermally sealed to an upper end of the housing so that the battery cover overlies the cells each having a filling hole, a filling plug and a vent chamber; terminals mounted on the battery cover and connected to the cells; and a vent chamber cover thermally sealed to the battery cover, characterized in that the battery cover is provided with a vent line adjacent to the cells, being in flow communication with the spaces above the cells and having an exit end tilted upwardly and that a vent cap assembly is fitted to the vent line at the tilted exit end.

The vent line may preferably have a gentle downward slope from the exit end towards the other end of the vent line.

In a preferred embodiment of the present invention, the vent cap assembly comprises a vent cap fitted to the tilted exit end of the vent line, and a gas filter fitted into the vent cap for allowing the vented gas to escape.

The vent cap preferably has a vent hole in communication with the tilted exit end of the vent line, a first vertical hole extending from the vent hole to the outer periphery of the vent cap and a helical path on the outer periphery connected at its one end to the first vertical hole and at its other end to a second vertical hole extending to the center of the vent cap so as to be in communication with the gas filter.

The gas filter may be a water-repellant microporous gas filter. The microporous filter has preferably a grain size of about 270 microns.

The gas filter can be press-fitted into the vent cap and closed by means of a filter cover having a hole for escape of the vented gas.

In the aforementioned aspect of the present invention, the vent chambers may be provided inside of the vent line, corresponding to each cell in the main cover with the downward slope, opening into a funnel-like drain hole to facilitate drainage of electrolyte into the respective cells when the battery is in the upright position, each vent chamber may be in flow communication with the space above each cell and the vent chambers may be in flow communication with each other, each vent chamber may be provided with a gas escape hole at an elevated position with respect to the drain hole so as to allow the escape of the gases even when the drain hole is full of electrolyte, and the vent chamber which is remote from the tilted exit end of the vent line is provided with an exit hole so that any electrolyte leaking from the cell has to pass through the vent chambers before exiting out of the vent chamber through the exit hole towards the tilted exit end of the vent line. The chambers may be preferably formed of baffle sheet.

In the battery according to the present invention, the battery cover is such that even if the battery is tilted by 90 degree on either side, the electrolyte height is below the tilted exit end of the vent line so as to make the battery leak-resistant in any of these positions. Also, this arrangement provides an air lock, which prevents electrolyte leakage even when the battery is kept in the inverted position for a considerable length of time such as more than two hours, for example.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF PREFERRED EMBODIMENTS

Figure 1:
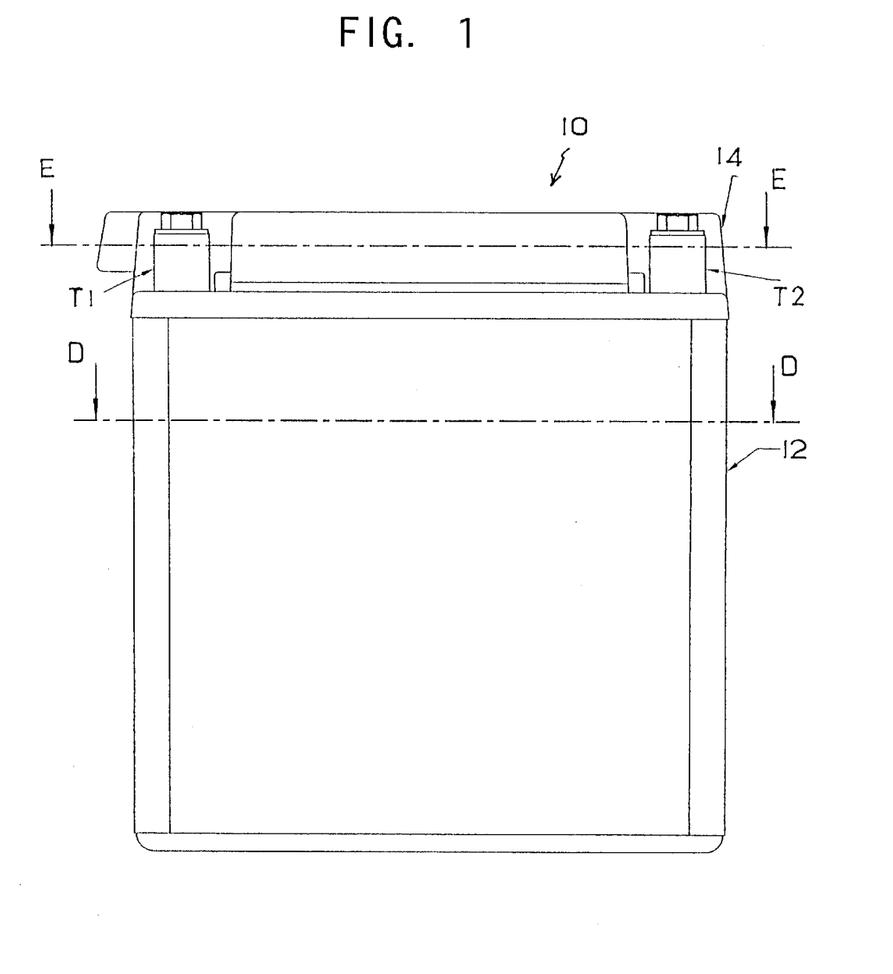
FIG. 1 is a front view of a vented-type leak-resistant motor cycle battery according to the present invention.
Figure 2:
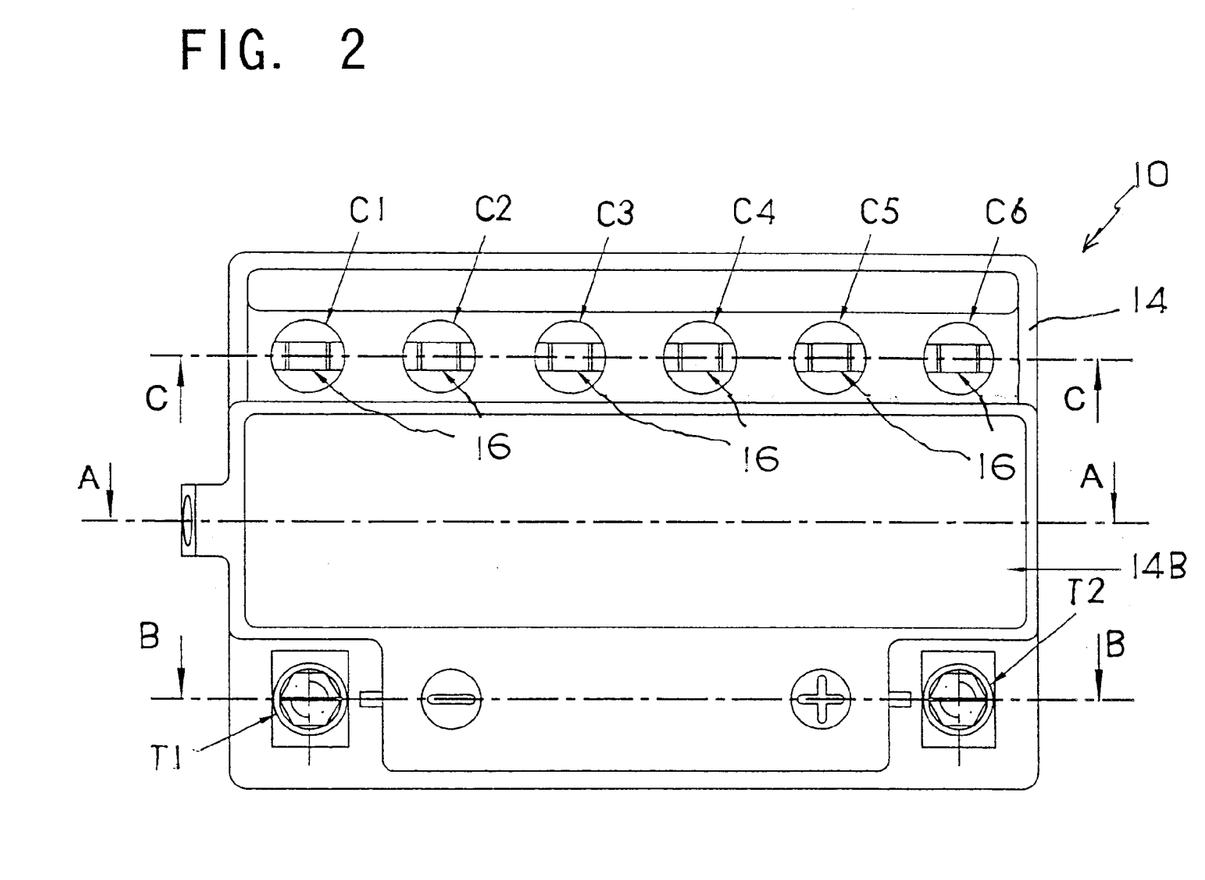
FIG. 2 is a plane view of the vented-type leak-resistant motor cycle battery of FIG. 1.
Figure 3:
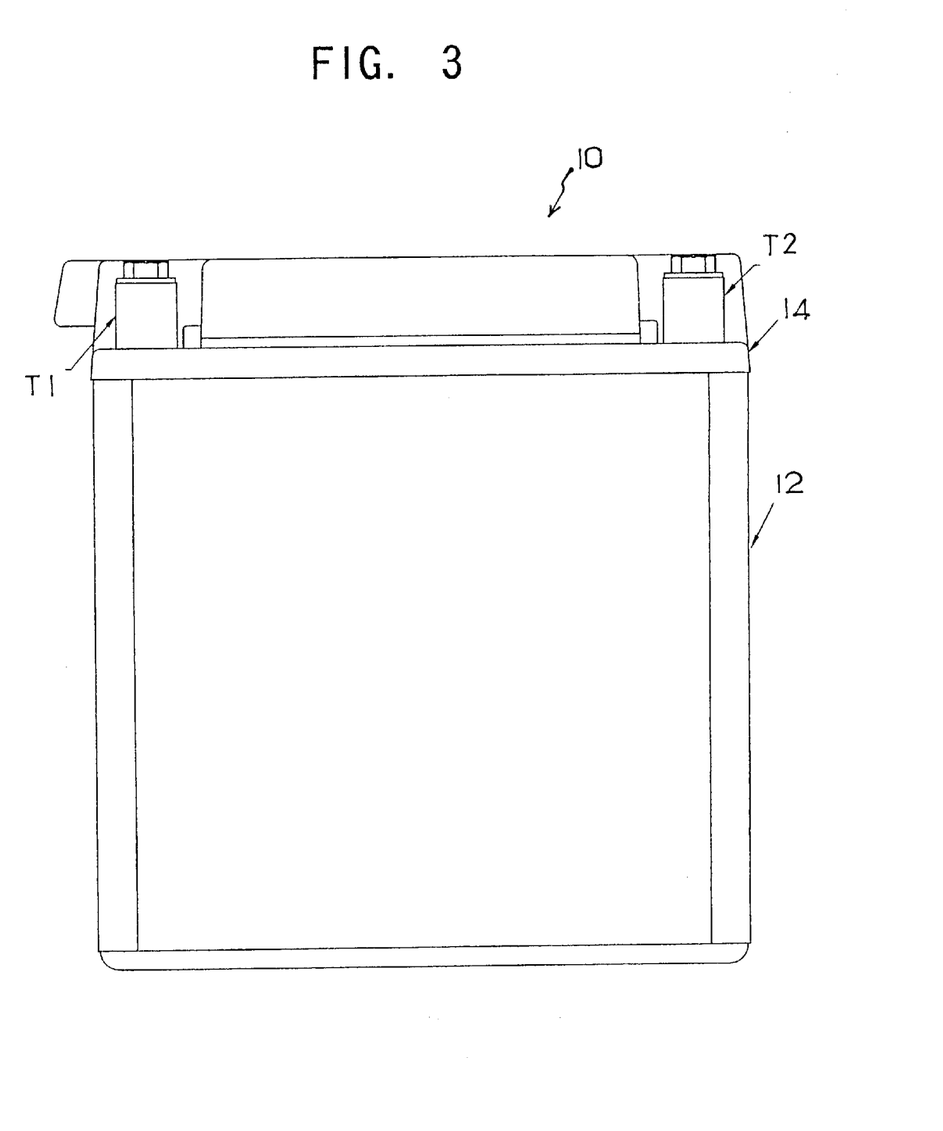
FIG. 3 is a rear view of the vented-type leak-resistant motor cycle battery of FIG. 1.
Figure 4:
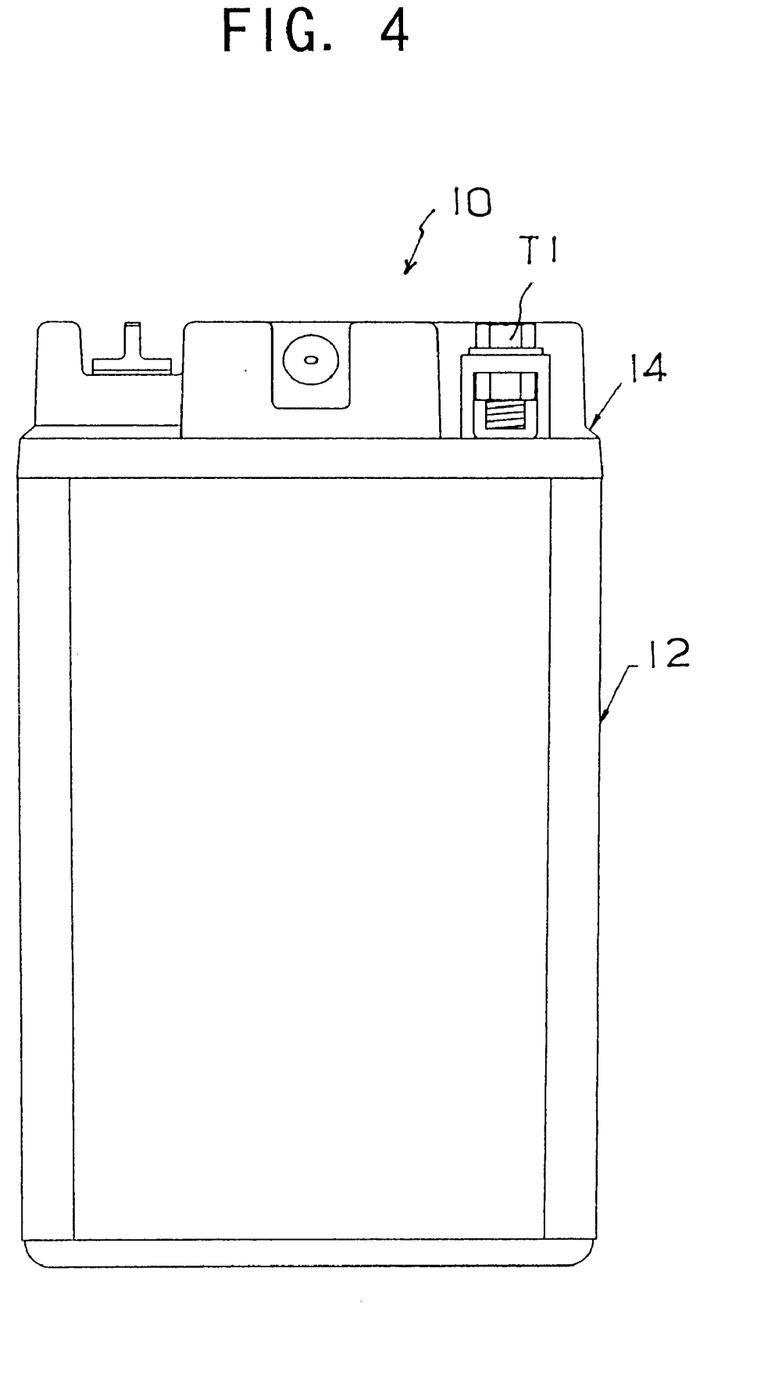
FIG. 4 is a side elevational view of the vented-type leak-resistant motor cycle battery of FIG. 1.

The invention will now be described with reference to the accompanying drawings, which show a preferred embodiment of the invention. Referring now to FIGS. 1 and 2, there is shown a vented-type leak-resistant motor cycle battery 10 constructed in accordance with one embodiment of the invention.

Figure 7:
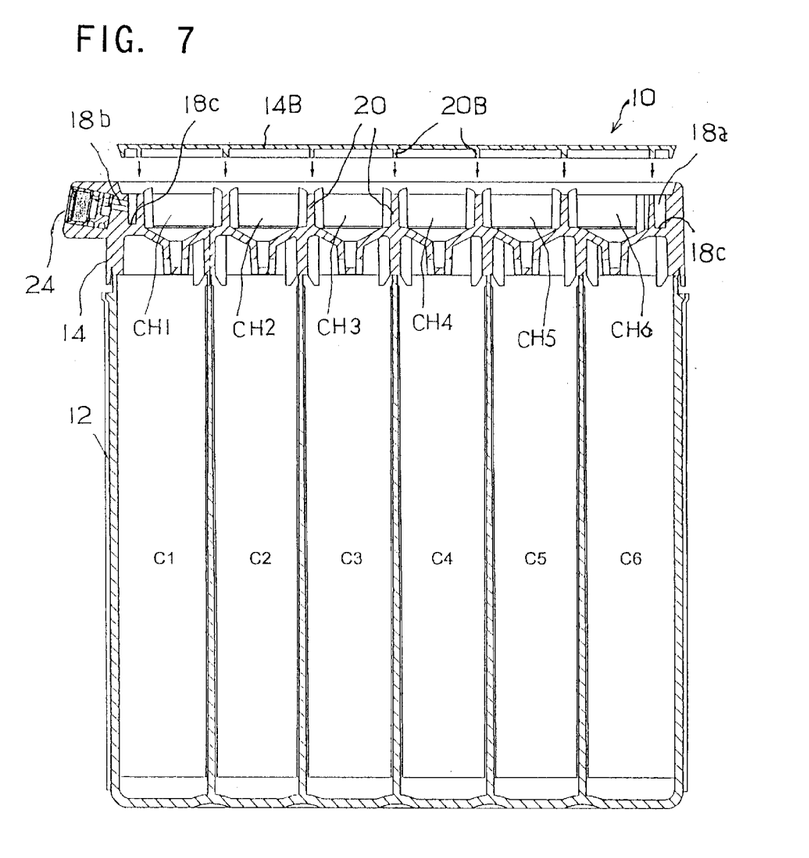
FIG. 7 is a cross sectional view of the battery identical to that of FIG. 5, but illustrating the state before the vent chamber cover is thermally sealed to the main cover.
Figures 8A, 8B:
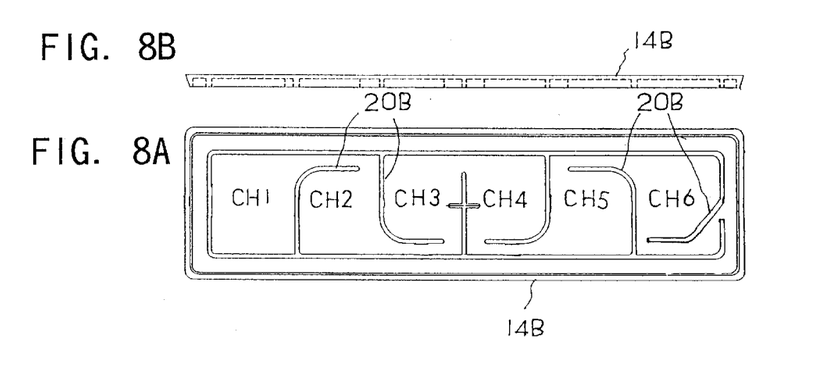
FIG. 8A is a rear view of the baffle sheets on the underside of the vent chamber cover before the vent chamber cover is thermally sealed to the main cover.
FIG. 8B is a front view of the baffle sheets of FIG. 8A.
Figure 9:
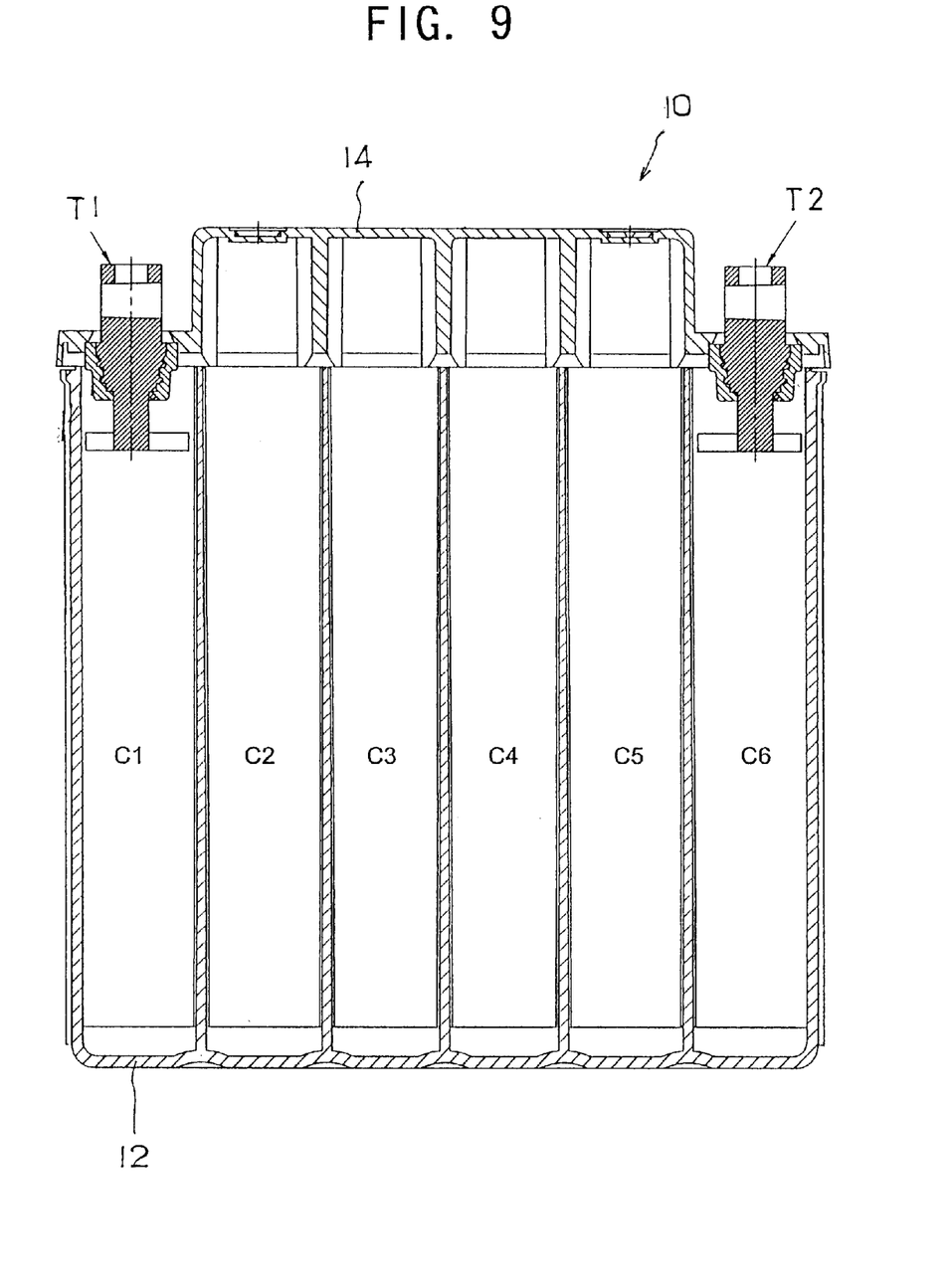
FIG. 9 is a cross sectional view of the battery taken along the section line B—B of FIG. 2.
Figure 10:
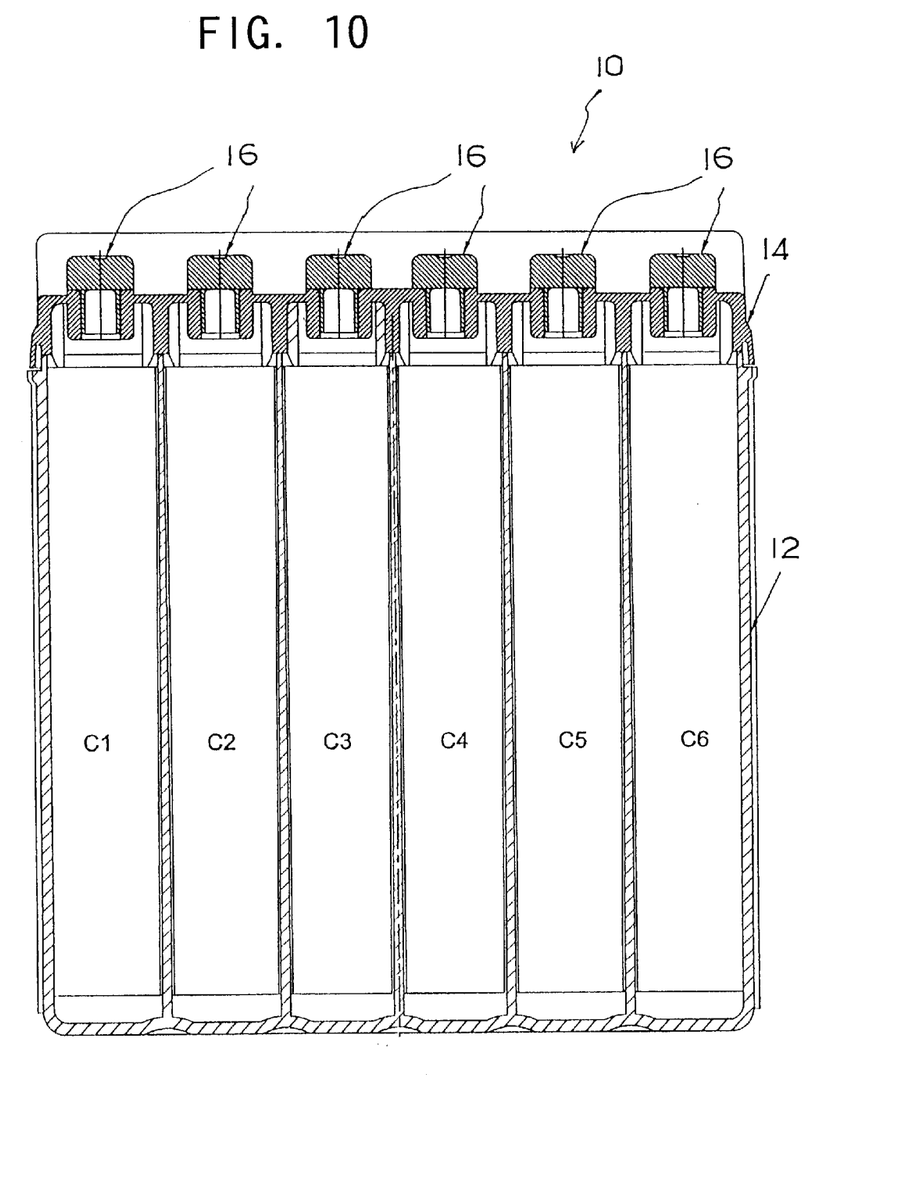
FIG. 10 is a cross sectional view of the battery taken along the section line C—C of FIG. 2.
Figure 11:
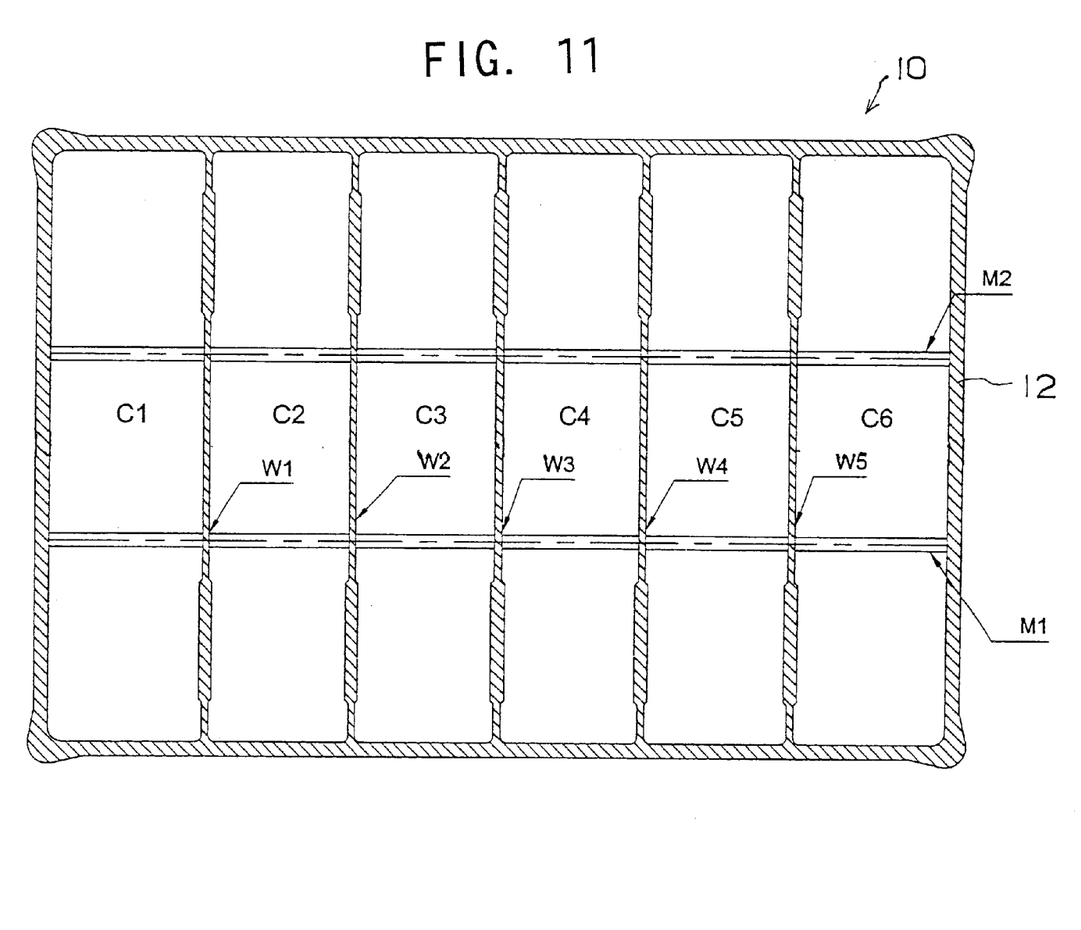
FIG. 11 is a cross sectional view of the battery taken along the section line D—D of FIG. 1.

It can be seen from FIGS. 1 and 2 that the vented-type leak-resistant motor cycle battery 10 according to the present invention comprises a housing 12 and a battery cover 14 thermally sealed to the top of the housing 12. The battery cover 14 has a vent chamber cover 14B, which is thermally sealed to a cover body 14A (see FIGS. 5, 7 and 8). Cells C1 through C6 are provided within the housing 12. Each cell has a filling plug 16 extending to the top of the battery cover 14 as shown in FIG. 10. Terminals T1 and T2 extending out of the battery cover 14 are connected to the cells C1 and C6 (see FIG. 9). In FIG. 11, reference numerals W1 through W5 designate partition walls to separate the cells from each other and reference numerals M1 through M5 designate saddles on which battery plates are mounted within the respective cells.

Figure 5:
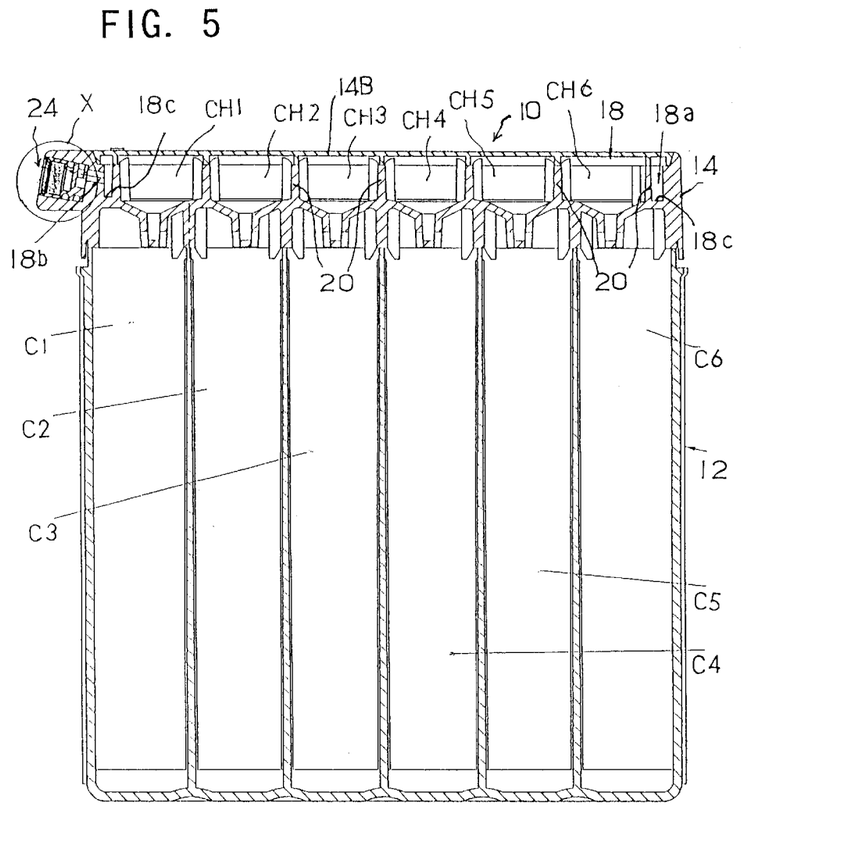
FIG. 5 is a cross sectional view of the battery along the section line A—A of FIG. 2.
Figure 6:
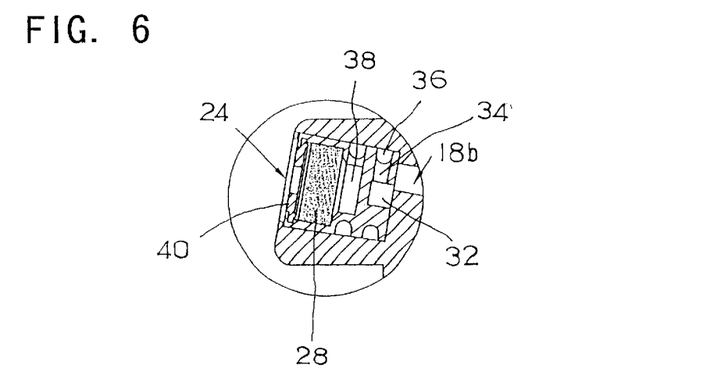
FIG. 6 is an enlarged view illustrating the details of the circle surrounded by "X" of FIG. 5.
Figure 12:
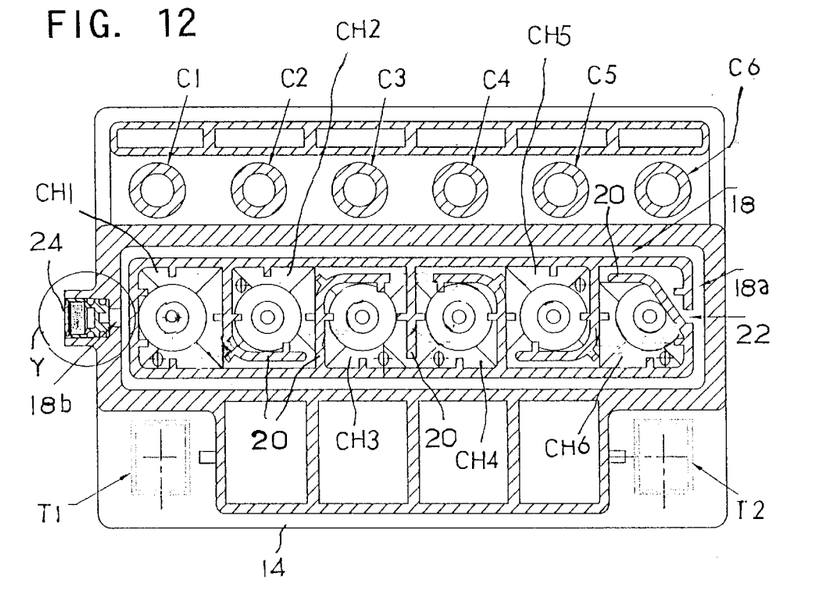
FIG. 12 is a cross sectional view of the battery taken along the section line E—E of FIG. 1.

As can be seen from FIGS. 5 and 12, the battery cover 14 is provided with a side vent line (a vent line extending in a longitudinal direction of the battery) 18 in communication with the spaces above the cells C1 through C6. As shown in FIG. 12, the vent line 18 is sealed at one end 18a by the wall of the battery cover 14. The other end 18b of the side vent line 18 is tilted to slope downwardly towards the end 18a thereof that is to slope upwardly towards the outside, which is shown in details in FIG. 6. At this end 18b of the vent line 18, a vent cap assembly 24 is fitted. By this arrangement, when any acid flows from the cells to the vent cap assembly through the side vent line 18, it is forced to flow back into the vent line 18 due to the slope provided along the vent line 18 from the tilted exit end 18b towards the end 18a of the vent line 18.

As noted from FIG. 12, the vent line 18 lies adjacent to the cells C1 through C6. Vent chambers CH1 through CH6 are provided inside of the vent line 18. These vent chambers CH1 through CH6 are in flow communication with the spaces above the respective cells C1 through C6. These vent chambers are formed by baffle sheets 20 and 20B, which are so arranged that the vent chambers are in flow communication with each other. The baffle sheets are provided in the battery cover 14 while the baffle sheets 20B are provided in the vent chamber cover 14B. Theses baffle sheets 20 and 20B provide the vent chambers CH1 through CH6 by being bonded to each other when the vent chamber cover 14B is thermally sealed to the battery cover 14.

Only the last vent chamber CH6 has an exit hole 22 for exit of the electrolyte from the vent chambers into the vent line 18. This exit end 22 is remote from the tilted end 18b of the side vent line 18 provided with the vent cap assembly 24, which will be described in details later. The baffle sheets 20 and 20B providing the vent chambers CH1 through CH6 comprise approximately L-shaped sheets alternately arranged in a reverse direction so that the electrolyte meanderingly moves between the adjacent vent chambers towards the exit hole 22 even when the electrolyte enters the vent chambers. The baffle sheet 20 for the vent chamber CH6 is arranged so that the opening end is located far from the exit hole 22 in a direction along the shorter side of the battery.

The provision of these vent chambers CH1 through CH6 retards flow of the electrolyte from the cells to the end 18b of the side vent line 18 due to the baffle sheets 20. Furthermore, as the downward slope is provided to the bottom surface 18c of the vent line 18, the end 18b of the vent line 18 preferably gets a higher level than the end 18a of the vent line 18. This slope of the bottom surface 18c of the vent line 18 will be noted from FIGS. 5 and 7 in which the bottom surface 18c of the vent line 18 on the side of the end 18a is located at a lower position than the bottom surface 18c on the end 18b. This forces any electrolyte to flow back from the end 18b of the vent line towards the end 18a of the vent line 18.

Figure 13:
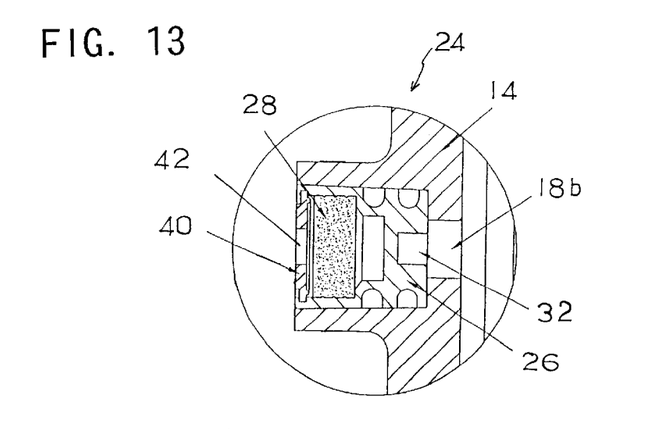
FIG. 13 is an enlarged view illustrating the details of the circle surrounded by "Y" of FIG. 12.

The vent cap assembly 24 is shown in FIGS. 12, 13, 14A, 14B and 14C. The vent cap assembly 24 comprises a vent cap 26, a filter 28 and a filter cover 40 and is fitted into the battery cover 14 in flow communication with the end 18b of the vent line 18 as shown in FIGS. 12 and 13. It can be seen from FIG. 14 that the vent cap 26 has a vent hole 32 in flow communication with the end 18b of the vent line 18 as shown in FIG. 13.

Figure 14A:
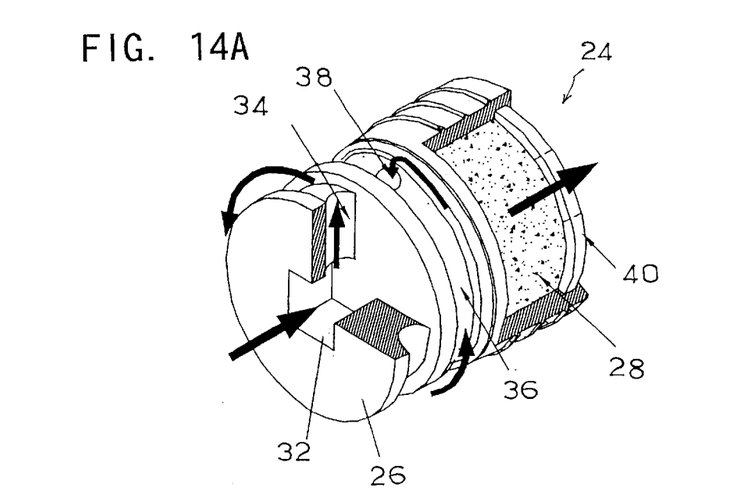
FIG. 14A is a perspective view of the vent cap assembly used for the invention with portions broken away.
Figure 14B:
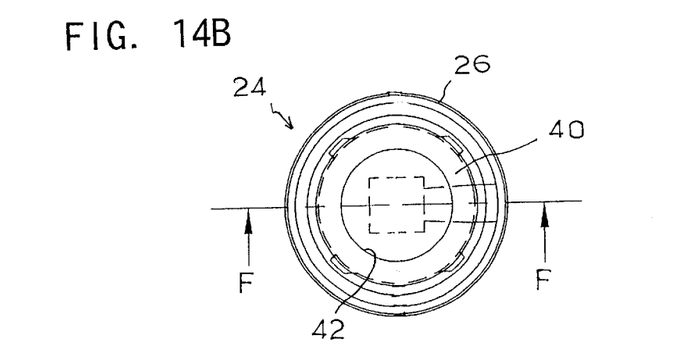
FIG. 14B is a front view of the vent cap assembly of FIG. 14A.
Figure 14C:
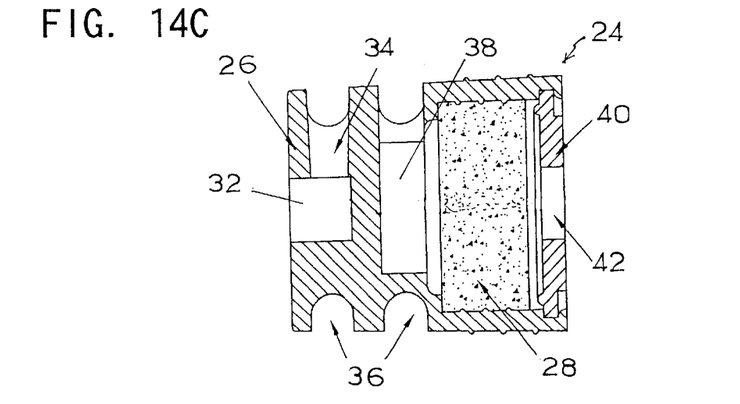
FIG. 14C is a cross sectional view of the vent cap assembly taken along the section line F—F of FIG. 14B.

As shown in FIGS. 14A through 14C, a first vertical hole 34 extends from the vent hole 32 to the outer periphery of the vent cap 26. The outer periphery of the vent cap 26 is provided with a helical path 36 in flow communication with the first vertical hole 34. At the end remote from the vent hole 32 of the vent cap 26, a second vertical hole 38 is provided in the vent cap 26 to extend from the outer periphery of the vent cap 26 to the center of the vent cap 26. The second vertical hole 38 is in flow communication with the downstream end of the helical path 36. The first and second vertical holes 34 and 38 and the helical path 36 form the labyrinth of the vent cap 26.

The filter 28 is press-fitted in the vent cap 26 and closed by means of the filter cap 40 so as to be in flow communication with the second vertical hole 38. The filter cap 40 has a hole 42 for escape of the vented gas. By this arrangement, the filter 28 is prevented from coming into contact with any excess electrolyte that flows into the side vent line 18.

The gas filter 28 is preferably a water repellant microporous gas filter. The filter may have a grain size of about 270 microns.

When any gas is vented from any cell of the battery, it is forced to enter the respective corresponding vent chamber in the side vent line 18 and escape through the exit hole 22 in the vent chamber CH6 (see FIG. 12). Then, the gas moves through the vent line 18 to the vent cap assembly 24 and enters the vent hole 32 thereof. Thereafter, the gas passes through the first vertical hole 34, traverses along the helical path 36 and passes the vent cap 26 through the second vertical hole 38. The gas is then filtered by the filter 28 and vented to atmosphere through the hole 42 in the filter cover 40.

Figure 15:
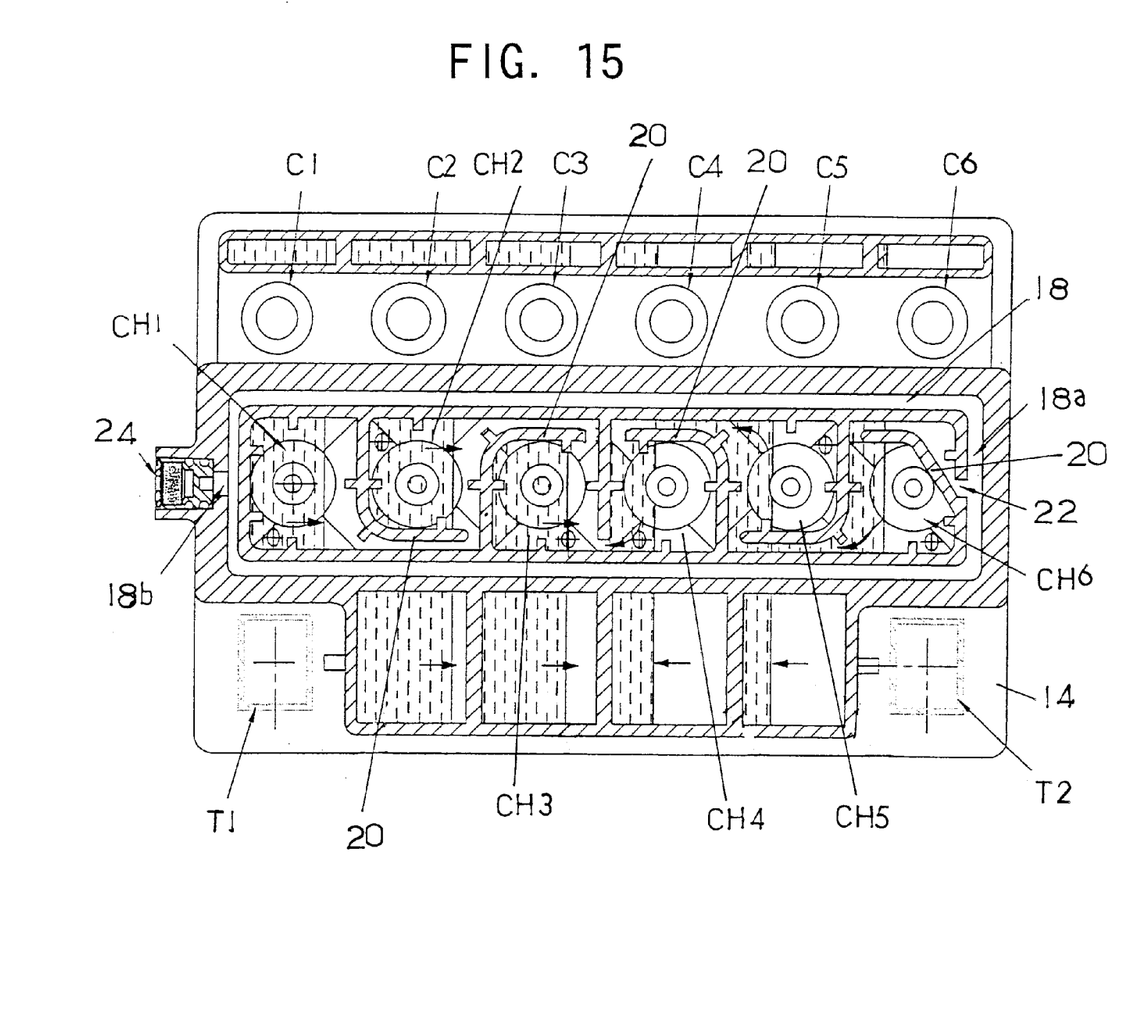
FIG. 15 is a horizontal cross sectional view of the battery of FIG. 1 tilted so as to lie on one of its shorter sides.

In FIG. 15, there is shown the battery 10 tilted through 90 degree to lie on one of its shorter sides. In this position, the electrolyte in each of the vent chambers CH1 through CH6 gradually flows down to the lower vent chamber. However, the electrolyte cannot come into contact with the vent cap assembly 24 in the end 18b of the side vent line 18 because the only passage available is through the exit hole 22 of the upper-most vent chamber CH6 that can never be filled up in this position. Thus, the leakage of the acid towards the vent cap assembly 24 is precluded.

Figure 16:
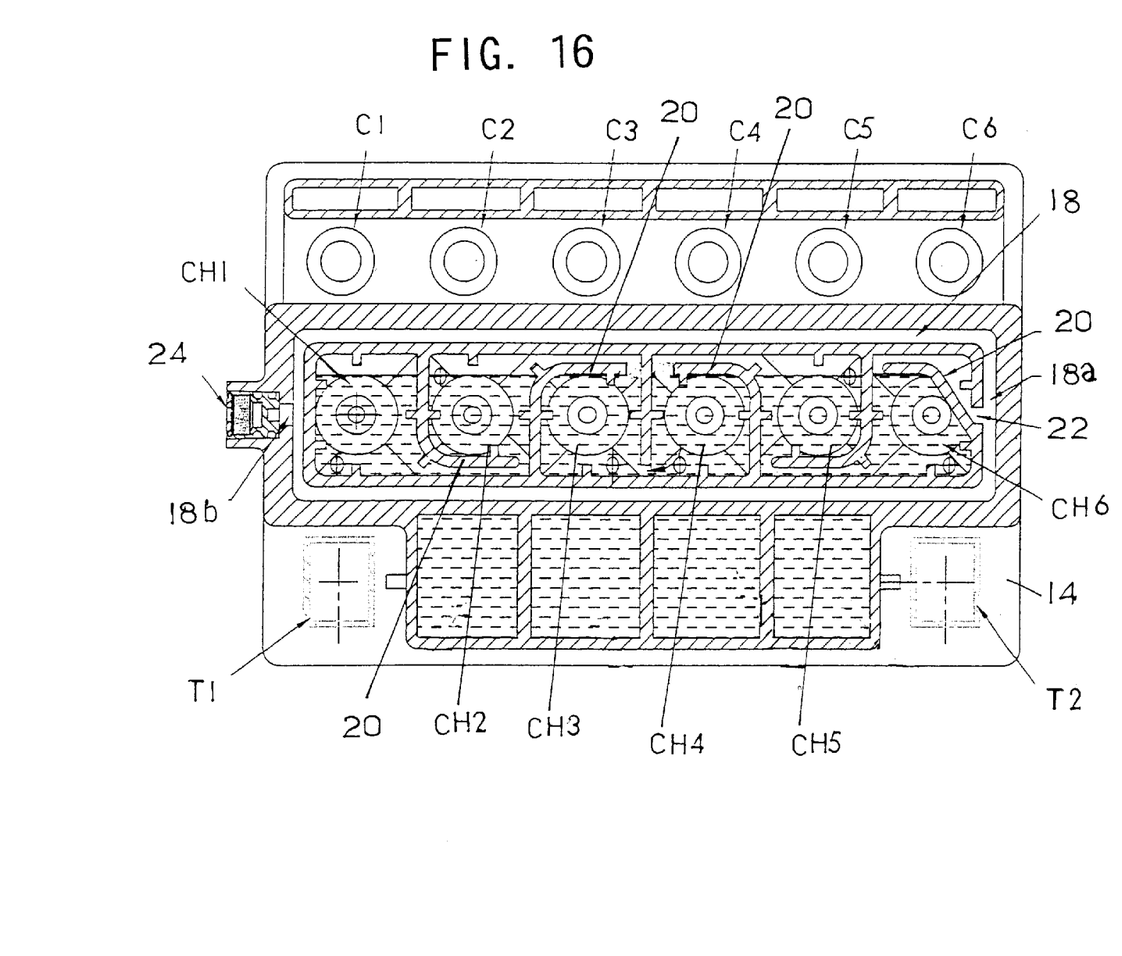
FIG. 16 is a horizontal cross sectional view of the battery of FIG. 1 tilted so as to lie on one of its longitudinal sides.

In FIG. 16, there is shown the battery 10 tilted through 90 degree to lie on one of its longitudinal sides. In this case, the electrolyte cannot reach the vent cap assembly 24 because the electrolyte cannot exceed the opened edge (upper edge) of the baffle sheet 20 within the vent chamber CH6 in flow communication with the exit hole 22 whereby the electrolyte cannot enter the vent line 18 through the exit hole 22.

When the battery 10 is inverted, an air lock is created by the provision of the vent cap assembly 24 at one end of the vent line 18. Thus, there will be no leakage of the electrolyte for a considerable length of time such as more than 2 hours even in this position of the battery 10.

In this manner, even if the battery is tilted by 90 degree on either side, the electrolyte height is below the tilted exit end of the vent line so as to make the battery leak-resistant in any of these positions and also the air lock is provided which prevents electrolyte leakage even when the battery is kept in the inverted position for a considerable length of time.

Although one preferred embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. A vented-type leak-resistant motor cycle battery comprising a housing in which a plurality of cells are mounted; a battery cover sealed to an upper end of the housing in a liquid tight manner so that said battery cover overlies said cells each having a filling hole, a filling plug and a vent chamber; and a vent chamber cover sealed in a liquid tight manner to said battery cover, characterized in that said battery cover is provided with a vent line extending in a longitudinal direction of said battery cover in flow communication with spaces above said cells and having an exit end tilted upwardly and that a vent cap assembly is fitted to said vent line at said tilted exit end.

2. A vented type leak-resistant motor cycle battery as set forth in claim 1 and wherein said vent line at the end opposite to said exit end thereof is closed and is tilted downwardly from said exit end of said vent line toward the opposite end of said vent line.

3. A vented type leak-resistant motor cycle battery as set forth in claim 1 and wherein there are provided vent chambers for said respective cells inside of said vent line and communicating with each other.

4. A vented type leak-resistant motor cycle battery as set forth in claim 1 and wherein said vent line at the end opposite to said exit end thereof is closed and is tilted downwardly from said exit end of said vent line toward the opposite end of said vent line and there are provided vent chambers for said respective cells inside of said vent line and communicating with each other.

5. A vented type leak-resistant motor cycle battery as set forth in claim 4 and wherein said vent chamber furthest from said exit end of said vent line have an exit hole in communication with said vent line.

6. A vented type leak-resistant motor cycle battery as set forth in claim 4 and wherein said vent chambers are formed of baffle sheet.

7. A vented type leak-resistant motor cycle battery as set forth in claim 5 and wherein said vent chambers are formed of baffle sheet.

8. A vented type leak-resistant motor cycle battery as set forth in any of claims 1 through 7 and wherein said vent cap assembly is formed so that gases from said exit end of said vent line contact a gas filter through a labyrinth.

9. A vented type leak-resistant motor cycle battery as set forth in any of claims 1 through 7 and wherein said vent cap assembly is formed so that gases from said exit end of said vent line contact a gas filter through a labyrinth, said labyrinth being provided in a vent cap and comprising a vent hole in communication with said tilted exit end of said vent line, a first vertical hole extending from said vent hole to an outer periphery of said vent cap, a helical path on said outer periphery of said vent cap, connected at its one end to said first vertical hole and at its other end to a second vertical hole extending to a center of said vent cap so as to be in communication with said gas filter.

10. A vented-type leak-resistant motor cycle battery comprising a housing in which a plurality of cells are mounted; a battery cover thermally sealed to an upper end of said housing so that said battery cover overlies said cells each having a vent chamber, a filling hole and a filling plug and terminals provided on said battery cover and connected to said cells, said battery cover having a vent chamber cover thermally sealed thereto; and characterized in that said battery cover is provided with a side vent line adjacent to said cells, said vent line being in flow communication with spaces above said cells; said vent line has an exit end tilted upwardly and a vent cap assembly is fitted to said vent line at said tilted exit end thereof.

11. A vented type leak-resistant motor cycle battery as set forth in claim 10 and wherein said vent line has a gentle downward slope from said exit end towards the other end of said vent line.

12. A vented type leak-resistant motor cycle battery as set forth in claim 10 and wherein said vent cap assembly comprises a vent cap fitted to said tilted exit end of said side vent line and a gas filter attached to said vent cap for allowing the vented gas to escape.

13. A vented type leak-resistant motor cycle battery as set forth in claim 10 and wherein said vent line has a gentle downward slope from said exit end and said vent cap assembly comprises a vent cap fitted to said tilted exit end of said side vent line and a gas filter attached to said vent cap for allowing the vented gas to escape.

14. A vented type leak-resistant motor cycle battery as set forth in claim 12 and wherein said vent cap has a vent hole in communication with said tilted exit end of said vent line, a first vertical hole extending from said vent hole to an outer periphery of said vent cap, a helical path on the outer periphery connected at its one end to said first vertical hole and at its other end to a second vertical hole extending to the center of said vent cap so as to be in communication with said gas filter.

15. A vented type leak-resistant motor cycle battery as set forth in claim 13 and wherein said vent cap has a vent hole in communication with said tilted exit end of said vent line, a first vertical hole extending from said vent hole to an outer periphery of said vent cap, a helical path on the outer periphery connected at its one end to said first vertical hole and at its other end to a second vertical hole extending to the center of said vent cap so as to be in communication with said gas filter.

16. A vented type leak-resistant motor cycle battery as set forth in any of claims 12 through 15 and wherein said gas filter is a water-repellant micro-porous gas filter.

17. A vented type leak-resistant motor cycle battery as set forth in any of claims 12 through 15 and wherein said gas filter is a water-repellant micro-porous gas filter having a grain size of about 270 microns.

18. A vented type leak-resistant motor cycle battery as set forth in any of claims 12 through 15 and wherein said gas filter is press fitted into said vent cap and closed by means of a filter cover having a hole for escape of the vented gas.

19. A vented type leak-resistant motor cycle battery as set forth in claim 10 and wherein vent chambers are provided inside of said side vent line, each vent chamber being in flow communication with the space above the corresponding cell and said vent chambers being in flow communication with each other; and said vent chamber which is remote from said tilted exit end of said side vent line is provided with an exit hole so that any electrolyte leaking from said cells should pass through said vent chambers before exiting out of said corresponding vent chamber through said exit hole towards said tilted exit end of said side vent line.

20. A vented type leak-resistant motor cycle battery as set forth in claim 19 and wherein said vent chambers are formed of baffle sheets.

* * * * *